April 5, 1960              L. B. SADOW              2,931,226
INDICATING ATMOSPHERIC RESPONSIVE INSTRUMENT
WITH CALIBRATING ADJUSTMENT
Filed Aug. 23, 1956
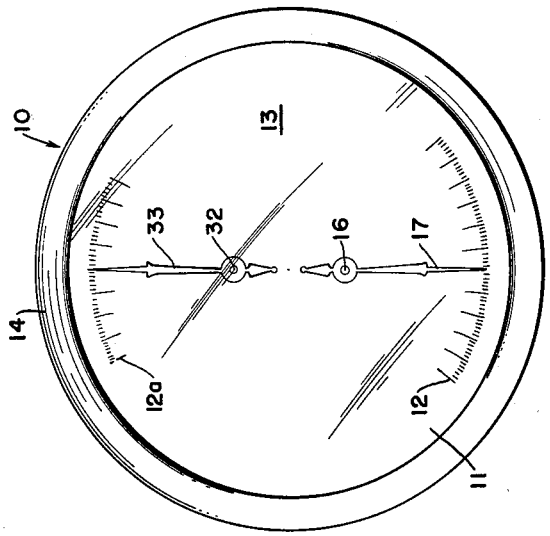
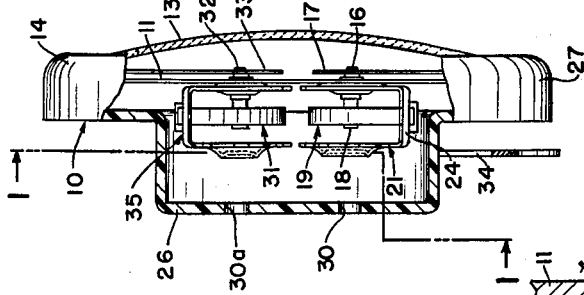
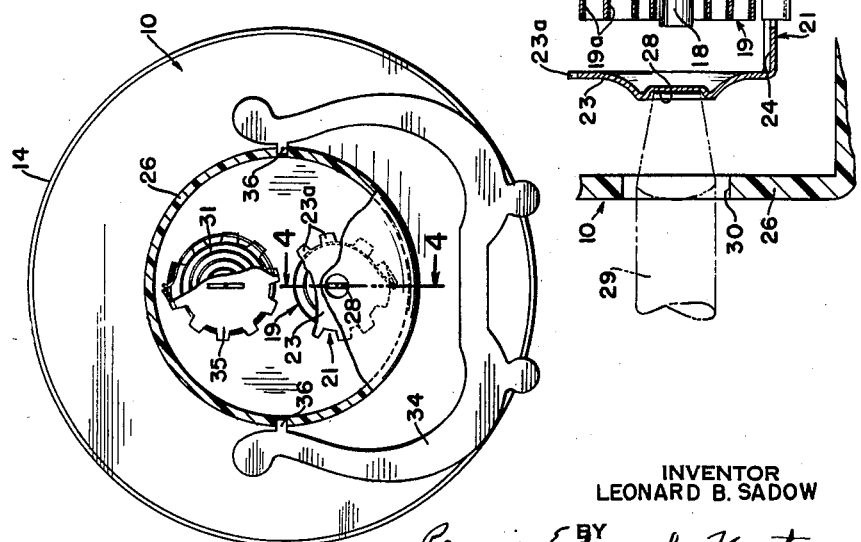
INVENTOR
LEONARD B. SADOW
HIS ATTORNEYS

United States Patent Office 2,931,226
Patented Apr. 5, 1960

2,931,226

INDICATING ATMOSPHERIC RESPONSIVE INSTRUMENT WITH CALIBRATING ADJUSTMENT

Leonard B. Sadow, White Plains, N.Y., assignor to Longines-Wittnauer Watch Co., Inc., New York, N.Y., a corporation of New York Application August 23, 1956, Serial No. 605,752

1 Claim. (Cl. 73—336)

The present invention relates to instruments for indicating a condition of the atmosphere such as its relative humidity or temperature and, more particularly, to an indicating instrument in which is incorporated an improved and simplified means for calibration to compensate for variations arising, for example, through manufacturing deviations.

A common form of indicating hygrometer comprises an indicating pointer mounted for rotation with respect to a calibrated dial and which is actuated by means of a spirally coiled element attached at one end to the pointer and fixed at its other end. The coiled actuating element comprises a metallic strip to which is bonded a layer of absorbent material. The absorbent material absorbs or gives up moisture in accordance with the changing relative humidity of the air, and this causes the absorbent material to expand and contract, causing the coiled metallic strip to bend, thereby moving the indicating pointer.

A conventional form of indicating thermometer is actuated by a bi-metallic strip coiled into spiral form. As is well understood, changes in temperature cause one portion of the strip to expand to a greater degree than the other portion, resulting in a change in the curvature of the strip which produces the motion of the indicating pointer.

The present invention contemplates the manufacture of an indicating hygrometer and thermometer of inexpensive construction, in which manufacturing tolerances are of necessity quite large. This permits a rather large variation between individual instruments, so that under the same atmospheric conditions different humidity or temperature indications may be given with different instruments. Accordingly, it is the primary object of the invention to provide a novel and effective, and yet economical, arrangement for calibrating the instruments, after assembly, with respect to a standard to compensate for manufacturing variations.

The instruments to which this invention relates are usually sold in jewelry stores, and it has been found that the instruments may have their factory calibration disturbed during transit so as to give improper readings. An additional object of the invention is to provide a construction for these instruments such that they can be re-calibrated in the jewelry store without removing their casings, by comparison with standard instruments.

The invention seeks to provide a simplified and inexpensive arrangement for adjusting the fixed ends of the coiled moisture and temperature responsive actuating elements for changing the reference positions of the indicating pointers.

For a better understanding of the invention, reference may be had to the accompanying drawing, in which Fig. 1 is a vertical section taken on line 1—1 of Fig. 2, of a combined hygrometric and thermometric instrument incorporating the improvements of the present invention;

Fig. 2 is a side elevation of the instrument of Fig. 1 with casing and dial parts broken away;

Fig. 3 is a front elevation of the instrument of Fig. 1; and

Fig. 4 is an enlarged fragmentary sectional view taken along line 4—4 of Fig. 1.

The illustrated device comprises a housing or casing 10 which is open at the front for receiving a circular dial plate 11 having thereon suitable graduations 12 for the hygrometric scale and 12a for the temperature scale. In accordance with usual practice, the face of the instrument is covered with a glass 13 held in place with its margin against the dial by means of a bezel 14. The dial plate 11 is formed of metal or other relatively stiff material and has an aperture therein in which a bearing sleeve 15 for the hygrometric mechanism is received with a push fit (Fig. 4).

The sleeve 15 projects slightly beyond the front face of the plate 11 and a considerable distance beyond the rear face of the plate. It may have a small collar or bead 15a to position it in the aperture. A shaft 16 is journaled in the bearing 15 and its forward end projects beyond the bearing sleeve 15 and has an indicating pointer 17 secured thereto. In the assembled device this pointer is arranged to move over the graduations 12 on the front face of the plate 11.

At its rearward end, the shaft 16 projects beyond the bearing sleeve 15 and mounts a collar 18. The collar 18 has a diametrically cut slot therein, in which is received the inner end of a coiled moisture-responsive actuating element 19. The outer end of the coiled element 19 is secured to an anchor member 21, being passed through a slot therein.

The coiled actuating element 19 comprises a strip of Phosphor bronze, for example, or other suitable material having spring-like characteristics. The metal strip has bonded to one surface a strip or layer 19a of dense but absorbent paper or other appropriate material which will absorb moisture from the air surrounding the element. The arrangement is such that variation in the amount of moisture absorbed by the absorbent layer will cause contractions or elongations of such layer or absorbent strip which result in change in curvature of the combined paper and metal element 19 so that the indicating pointer 17 is rotated. The element functions like a bimetallic strip or coil. The characteristics of the coiled element 19 are so related to the graduations 12 on the dial that the pointer 17 gives an indication of the relative humidity of the atmosphere surrounding the instrument.

It is contemplated in the present instance that the illustrated device will be of inexpensive construction throughout. Therefore, by necessity, manufacturing tolerances are quite large, which may cause inaccuracies in certain instruments and variations in the indications given by different instruments. Accordingly, it is desirable to provide means for quickly adjusting the individual instruments in reference to a standard, and to be able to do this after complete assembly within the casing.

To this end the device of the present invention includes the anchor piece or member 21 which has a foot portion 22 adjacent plate 11 and a crown portion 23 which is spaced rearwardly from the foot portion 22, these two portions being united at their peripheries by a leg portion 24. The anchor piece 21 is advantageously formed in one piece as a metal stamping. The foot portion 22 is positioned inwardly of the actuating element 19 and the crown portion 23 outwardly of this element, these two members being generally circular in shape and having their centers concentric with the shaft 16. The inner or foot portion 22 has a central aperture which fits snugly over the outside of the sleeve-like bearing member 15. A spring washer 25 is slipped over the outer end of bearing 15 and the extreme end of this bearing is swaged or peened over as indicated at 15b to permanently secure the parts in position. The spring washer 25 holds the inner surface of foot portion 22 in frictional engagement with the inner surface of the dial plate member 11. Thus, the anchor piece 21 is mounted for adjusting rotative positioning about the axis of sleeve bearing 15 and the shaft 16 of the instrument.

The casing 10 is made in two sections, a rear section 26 and a front section 27, these two parts being telescoped one within the other. Before assembly the device can be calibrated by comparing the indication of its pointer 17 with a standard or reference instrument, and the pointer 17 adjusted by grasping the crown portion 23 between the thumb and fingers and turning the anchor piece 21. To facilitate this, the periphery of the crown member 23 is serrated as indicated at 23a in Fig. 1. It will be understood that the adjusting rotative movement of the anchor piece 21 carries the spirally coiled actuating element 19 and indicator pointer 17 to the new position in which the pointer gives the desired indication.

Also a similar calibration may be made after assembly, and to this end the outer or rear surface of the crown portion 23 is provided with a slot-like recess 28 for the reception of a calibrating key, as indicated in dot-and-dash lines at 29 in Fig. 4. In order to permit the insertion of such key, an aperture 30 is provided in rear casing 26 in alignment with the adjustment axis of the anchor piece 21. Thus, after the instrument is assembled, a further comparison of the indication of pointer 17 with that of a standard instrument may be made, and, in the event the indications do not agree, the key 29 may be inserted and the anchor piece rotated to bring the pointers into agreement.

The improved indicator device is advantageous in that it is an extremely simplified and inexpensive structure, and therefore suitable for incorporation in an inexpensive instrument. The new construction provides for maximum tolerances in manufacturing procedures by providing a quick and efficient means for properly calibrating the instruments after assembling so that the same may be brought into agreement with a known reference or standard.

At the upper portion of the instrument shown in the drawing, there is a temperature-indicating device or thermometer so that the single instrument may, if desired, be used to indicate room temperature and relative humidity. The operating element of such temperature-indicating mechanism is a spirally coiled bimetallic element 31, the inner end of which is fixed to a shaft 32 carrying at its outer end a temperature-indicating pointer 33 which operates over the temperature scale 12a provided at the upper part of the dial plate 11.

If desired, this temperature responsive element 31 may be mounted in the same way as described above in connection with the hygrometer or humidity responsive mechanism. For economy of manufacture an anchor piece 35 may be used which is identical with the anchor piece 21, even to the detail of the inclusion of a slot for the reception of an adjusting key. Also a hole 30a may be provided for the insertion of such a key. In this way both the thermometric mechanism and the hygrometric mechanism can easily be recalibrated after being received by the customer, usually a jeweler, should either of the actuating mechanisms be thrown out of adjustment, by jarring or otherwise, during shipment.

The casing 10 is provided with a rest or easel 34 which is pivoted to the frame at 36 and may be swung rearwardly to support the instrument at an angle inclined somewhat from the vertical.

I claim:

In an indicating instrument of the type having a case, a calibrated dial at the front of the case, an indicating pointer journalled for rotation with respect to the front face of the dial, and a coiled atmosphere responsive actuating element having one end operatively connected to the pointer and being anchored at its other end, the improvement which comprises a sleeve-like bearing secured to the dial and projecting outwardly at its rear face, a drive shaft extending through the bearing and mounting the pointer at its front end and at its opposite end engaging the coiled element, a U-shaped anchor piece for the actuating element comprising a foot portion and a crown portion disposed one inwardly and one outwardly of the actuating element and interconnected near their margins by a leg portion, the coiled actuating element being anchored to said leg portion, said foot portion being rotatively mounted on the projecting portion of the sleeve-like bearing, and a spring washer mounted on said projecting portion of the sleeve-like bearing and urging said foot portion into frictional engagement with said dial, whereby said foot portion normally is held in fixed position relative to said dial but may be rotated relative thereto to adjustably position it with respect to the axis of the bearing, said crown portion having a serrated periphery adapted to be grasped by the fingers to turn said anchor piece bodily, and said crown portion also having a recess for the application of a key thereto to turn said anchor piece bodily, so that the rotative positioning of said actuating element and pointer may be made both prior to and after the assembly of the said mechanism within said case.

References Cited in the file of this patent

UNITED STATES PATENTS

| | | |
|---|---|---|
| 1,638,276 | Schultz | Aug. 9, 1927 |
| 1,757,986 | Whittier | May 13, 1930 |
| 2,060,984 | Fraher et al. | Nov. 17, 1936 |
| 2,093,767 | Rollefson | Sept. 21, 1937 |
| 2,280,393 | Ford | Apr. 21, 1942 |
| 2,743,610 | Seibert | May 1, 1956 |

FOREIGN PATENTS

| | | |
|---|---|---|
| 893,842 | France | Feb. 28, 1944 |